United States Patent [19]

Nakajima et al.

[11] Patent Number: 4,693,910
[45] Date of Patent: Sep. 15, 1987

[54] PROCESS FOR PRODUCING POROUS ANTIREFLECTIVE COATINGS

[75] Inventors: Sadahiro Nakajima; Hisayoshi Toratani, both of Tokyo, Japan

[73] Assignee: Hoya Corporation, Tokyo, Japan

[21] Appl. No.: 724,319

[22] Filed: Apr. 17, 1985

[30] Foreign Application Priority Data

May 7, 1984 [JP] Japan .................................. 59-89483

[51] Int. Cl.⁴ .............................................. B05D 5/06
[52] U.S. Cl. .................................... 427/168; 427/75; 427/169; 428/319.1; 428/428
[58] Field of Search .................. 427/167, 168, 169, 75; 428/319.1, 428

[56] References Cited

U.S. PATENT DOCUMENTS 4,434,191  2/1984  Cook et al. .......................... 427/169

Primary Examiner—George F. Lesmes
Assistant Examiner—P. R. Schwartz
Attorney, Agent, or Firm—Cushman, Darby & Cushman

[57] ABSTRACT

An antireflective coating and a process for producing the same are described. This antireflective coating has the difference in refractive index between the glass interface and the outer surface of the antireflected coating of 0.15 or less. This antireflective coating can be formed by treating a glass with an aqueous solution containing specified amounts of an acidic salt, $Al^{3+}$ and $Si^{4+}$. The antireflective coating has a high mechanical strength and optical elements having such an antireflective coating are useful for use in the laser nuclear fusion system.

3 Claims, 2 Drawing Figures

PROCESS FOR PRODUCING POROUS ANTIREFLECTIVE COATINGS

FIELD OF THE INVENTION

The present invention relates to a porous antireflective (AR) coating and a process for producing the same. More particularly, it is concerned with a porous AR coating which is formed on the surface of glass elements used in optical elements, target chamber windows, and so forth in the laser nuclear fusion system, and a process for producing such a porous AR coating.

BACKGROUND OF THE INVENTION

In the high power laser system, optical elements having formed thereon an AR coating having a high laser damage threshold are used to efficiently take out a laser output. Such an AR coating is usually formed by treating the surface of glasses with an aqueous solution of acidic salt showing weak basicity in water. Corrosion of the glass surface with an aqueous solution of acidic salt showing weak basicity such as $Na_2HAsO_4$ can be explained by the synergistic effect of two processes, one being a leaching process in which a somewhat porous layer, i.e., a so-called "Aoyake", is formed by the ion exchange reaction between alkali ions in the glass with $H^+$ ions the aqueous solution; and another being an etching process in which the Si-O-Si network of the glass is broken and the whole glass is dissolved.

If the leaching process is predominant, although a porous layer is formed, its porosity cannot increase sufficiently and, therefore, a satisfactory low refractive index layer cannot be formed. On the other hand, if the etching process is predominant, a porous layer is not almost formed and only the surface of glass is dissolved and, therefore, it is not possible to form a low refractive index layer.

It is known that if aluminum ion, $Al^{3+}$, is added to the aqueous solution of acidic salt showing weak basicity, the leaching process and the etching process can be appropriately controlled.

When, however, optical glasses used in the laser system are treated with such $Al^{3+}$-containing weakly basic aqueous solutions, although a low refractive index coating is formed, the coating thickness becomes constant at a certain value and cannot be increased beyond the value even if the treating duration time, treating temperature, and $Al^{3+}$ concentration are changed. That is, the coating thickness cannot be increased to such a level that the reflectivity becomes the minimum at $1.06\mu$ which is a lasing wavelength of $Nd^{3+}$ laser.

The present inventors have already disclosed in U.S. patent application Ser. No. 601,581, filed Apr. 18, 1984 that when a glass comprising, in % by weight, 65 to 75% $SiO_2$, 5 to 20% alkali metal oxide, 0 to 15% $B_2O_3$, 0 to 15% alkaline earth metal oxide, and 0 to 5% others is dipped in a treating solution prepared by further adding $Si^{4+}$ ions to a mixed solution of a weakly basic solution and the $Al^{3+}$-containing solution, the $Si^{4+}$ ions control the rate of etching of the glass surface, thereby lowering the reflectivity at any wavelengths and as a result, an AR coating which is a porous layer having a high laser damage threshold can be formed. However, this porous AR coating according to this method has a disadvantage in that the porosity on the surface is large and the coating has only such a mechanical strength that it is damaged by merely touching with a finger. This is inconvenient in assembling or handling the laser system.

SUMMARY OF THE INVENTION

An object of the present invention is to provide an AR coating formed on the surface of an optical glass, which is free of the above-described defects and has a high mechanical strength.

Another object of the present invention is to provide a process for producing such an AR coating.

The AR coating according to the present invention has the difference in refractive index between the glass interface and the outer surface of the AR coating of 0.15 or less.

Further, the process according to the present invention comprises treating a glass with an aqueous solution containing 0.01 to 1 mol/l of an acidic salt showing weak basicity in water, 0 to 0.01 mol/l of $Al^{3+}$ and $8.0 \times 10^{31\ 4}$ to $1 \times 10^{31\ 3}$ mol/l of $Si^{4+}$.

The above objects can be attained by increasing the concentration of $Si^{4+}$ in the mixed solution disclosed in the above-described U.S. patent application Ser. No. 602,581.

DETAILED DESCRIPTION OF THE INVENTION

Use of a treating solution which is prepared by adding 0 to 0.01 mol/l of $Al^{3+}$ and $8 \times 10^{-4}$ to $1 \times 10^{-3}$ mol/l of $Si^{4+}$ to an aqueous solution containing 0.01 to 1 mol/l of an acidic salt showing weak basicity in the aqueous solution and controlling the pH with an acid solution can provide an AR coating having a gradient refractive index such that the refractive index of the outer surface of the AR coating increases and on the other hand, the refractive index of the glass interface decreases compared to those of film treated by $Si^{4+}$ free solution.

Further, the mechanical strength of the AR coating greatly increases as the refractive index of the outer surface of the AR coating increases and the minimum reflectivity does not substantially change even if the gradient of the refractive index is varied.

The fact that the mechanical strength greatly increases as the refractive index of the outer surface of the AR coating increases is confirmed by the Examples as described hereinafter. The fact that the minimum reflectivity does not almost change even if the gradient of the refractive index is varied will hereinafter be explained.

Figure 1:
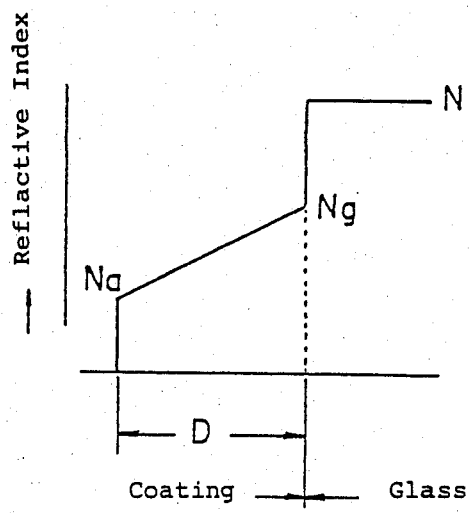
FIG. 1 is a schematic view illustrating the refractive index structure of an AR coating.

It can be considered that the structure of the AR coating is represented by the model coating having a gradient refractive index as shown in FIG. 1. Assuming that light is incident vertically to the coating, the reflectivity R is represented by the equation (1):

$$R = 1 - \frac{4Na \times Ng \times N}{(NaNg + N)^2 - (Na^2 - 1)(N^2 - Ng^2) \times \sin^2 \delta/2} \quad (1)$$

wherein $\delta = 2\pi(Na + Ng) \times D/\lambda$

N = Refractive index of glass

Na = Refractive index of the outer surface of coating
Ng = Refractive index of the glass interface of coating
λ = Wavelength
D = Coating thickness borosilicate glass manufactured by Schott & Gen, West Germany) was dipped at a liquid temperature of 87.5° C. for 20 minutes. The results are shown in Table 1 below.

TABLE 1

| Sample No. | Concentration of $Si^{4+}$ (mol/l) | Refractive Index of AR Coating | | Na × Ng | Minimum Reflectivity $R_{min}$ (%) | Refractive Index Difference Ng − Na |
| | | Surface Na | Glass Interface Ng | | | |
|---|---|---|---|---|---|---|
| a | 0 | 1.17 | 1.45 | 1.70 | 0.3 | 0.28 |
| b | 7.2 × 10⁻⁴ | 1.19 | 1.45 | 1.69 | 0.3 | 0.23 |
| c | 9.0 × 10⁻⁴ | 1.22 | 1.33 | 1.62 | 0.1 | 0.11 |
| d | 1.0 × 10⁻³ | 1.29 | 1.34 | 1.73 | 0.4 | 0.05 |

From the equation (1), the minimum value of reflectivity $R_{min}$ is $$R_{min} = \frac{(NaNg - N)^2}{(NaNg + N)^2} \quad (2)$$

Further, the relationship between Na, Ng and N can be given by the equation (3):

$$NaNg = N \times (1 + R_{min})/(1 - R_{min}) \quad (3)$$

It can be seen from the equation (3) that if the product of Na and Ng is constant, the minimum reflectivity does not change since in glasses having the same composition N is constant. That is, it can be seen that even if Na is increased to increase the mechanical strength of the AR coating, the minimum reflectivity is constant so long as the value of Na×Ng is constant. In the AR coating formed by increasing the concentration of $Si^{4+}$ in the treating solution, the value of Na×Ng is kept constant since Na becomes high while Ng becomes low, viz., the minimum reflectivity does not change. In the present invention, if the value of Ng−Na is 0.15 or less, and if Na is 1.2 or more, an AR coating having a sufficiently high mechanical strength can be obtained.

Examples of acidic salt showing weak basicity in an aqueous solution which can be used in the present invention include $Na_2HAsO_4$, $Na_2HCO_3$, $Na_2HPO_4$ and $NaC_2H_3O$. The concentration of the acidic salt in the treating solution can be chosen within the conventionally employed range, e.g., from 0.01 to 1 mol/l. If the concentration is too low, an AR coating is not formed. On the other hand, if the concentration is too high, a uniform AR coating is not obtained.

As the $Si^{4+}$ source, a diluted aqueous solution of $K_2O$-$SiO_2$ and so on can be used. The concentration of $Si^{4+}$ in the treating solution is chosen within the range of from $8.0 \times 10^{-4}$ to $1 \times 10^{-3}$ mol/l. If the concentration of $Si^{4+}$ is less than $8.0 \times 10^{-4}$ mol/l, the desired refractive index difference cannot be obtained. If the concentration is more than $1.0 \times 10^{-3}$ mol/l, an ununiform AR coating is only obtained.

As the $Al^{3+}$ source, $Al(NO_3)_3$ and other water-soluble aluminum salts and aluminates can be used.

The present invention is described in greater detail by reference to the following example.

EXAMPLE

Solutions containing 0.03 mol/l of $NaHAsO_4$, $10^{-3}$ mol/l of $Al^{3+}$ and various concentrations of $Si^{4+}$ as shown in Table 1 were adjusted to pH 8.0 with diluted nitric acid to prepare treating solutions. In each of treating solutions an optical glass BK-7 (trade name for a The mechanical strength of the AR coating was measured as follows.

Figure 2:
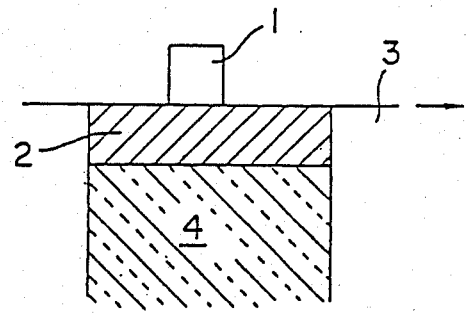
FIG. 2 is a cross-sectional view of the major portion of an apparatus for use in the measurement of a mechanical strength of an AR coating.

As shown in FIG. 2, a lens-polishing paper 3 was placed on an AR coating 2, and a load 1 was placed on the paper 3. The paper 3 was moved at a speed of 20 cm/sec, and scratches formed were inspected to determine the mechanical strength. The results are shown in Table 2.

TABLE 2

| Sample No. | Load (g/cm²) | | | | | | | |
| | 1.57 | 3.14 | 6.37 | 8.84 | 11.32 | 15.92 | 78.60 | 314.80 |
|---|---|---|---|---|---|---|---|---|
| a | o | x | x | x | | | | |
| b | o | o | x | x | | | | |
| c | o | o | o | o | o | o | Δ | |
| d | o | o | o | o | o | o | o | Δ | o: No scratch
Δ: Slight scratches
x: Seriously scratched

It can be seen from Table 2 that when the treating solutions containing $Si^{4+}$ are used, the mechanical strength of the AR coating is markedly increased.

If the mechanical strength is more than 11.32 g/cm², the AR coating is freed of problems such as breakage and scratch in handling, for example, incorporation of the optical system in the laser nuclear fusion system.

While the invention has been described in detail and with reference to specific embodiments thereof, it will be apparent to one skilled in the art that various changes and modifications can be made therein without departing from the spirit and scope thereof.

What is claimed is:

1. A process for producing optical glass having a porous antireflective coating comprising:
   treating an optical glass with an aqueous solution containing: (i) 0.01 to 1 mol/l of an acidic salt having weak basicity, said acidic salt selected from the group consisting of an $Na_2HAsO_4$, $Na_2HCO_3$, $Na_2HPO_4$ and $NaC_2H_3O$ and (ii) 0 to 0.01 mol./l of $Al^{3+}$; and
   $8.0 \times 10^{-4}$ to $1 \times 10^{-3}$ mol./l of $Si^{4+}$
   whereby a porous antireflective coating is obtained on said optical glass, said antireflective coating being substantially scratch-proof at loads in excess of 8.84 grams/cm².

2. The process according to claim 1, wherein the source of said $Si^{4+}$ is a diluted aqueous solution of $K_2O$-$SiO_2$.

3. The process according to claim 1, wherein the coating obtained is substantially scratch-proof at loads in excess of 11.32 grams/cm².

* * * * *